July 21, 1953  W. B. RETZ  2,646,152
STOP DEVICE FOR CHUCKING MEANS
Filed July 29, 1948  2 Sheets-Sheet 1

INVENTOR
WILLIAM B. RETZ
BY
ATTORNEYS

July 21, 1953    W. B. RETZ    2,646,152
STOP DEVICE FOR CHUCKING MEANS
Filed July 29, 1948    2 Sheets-Sheet 2
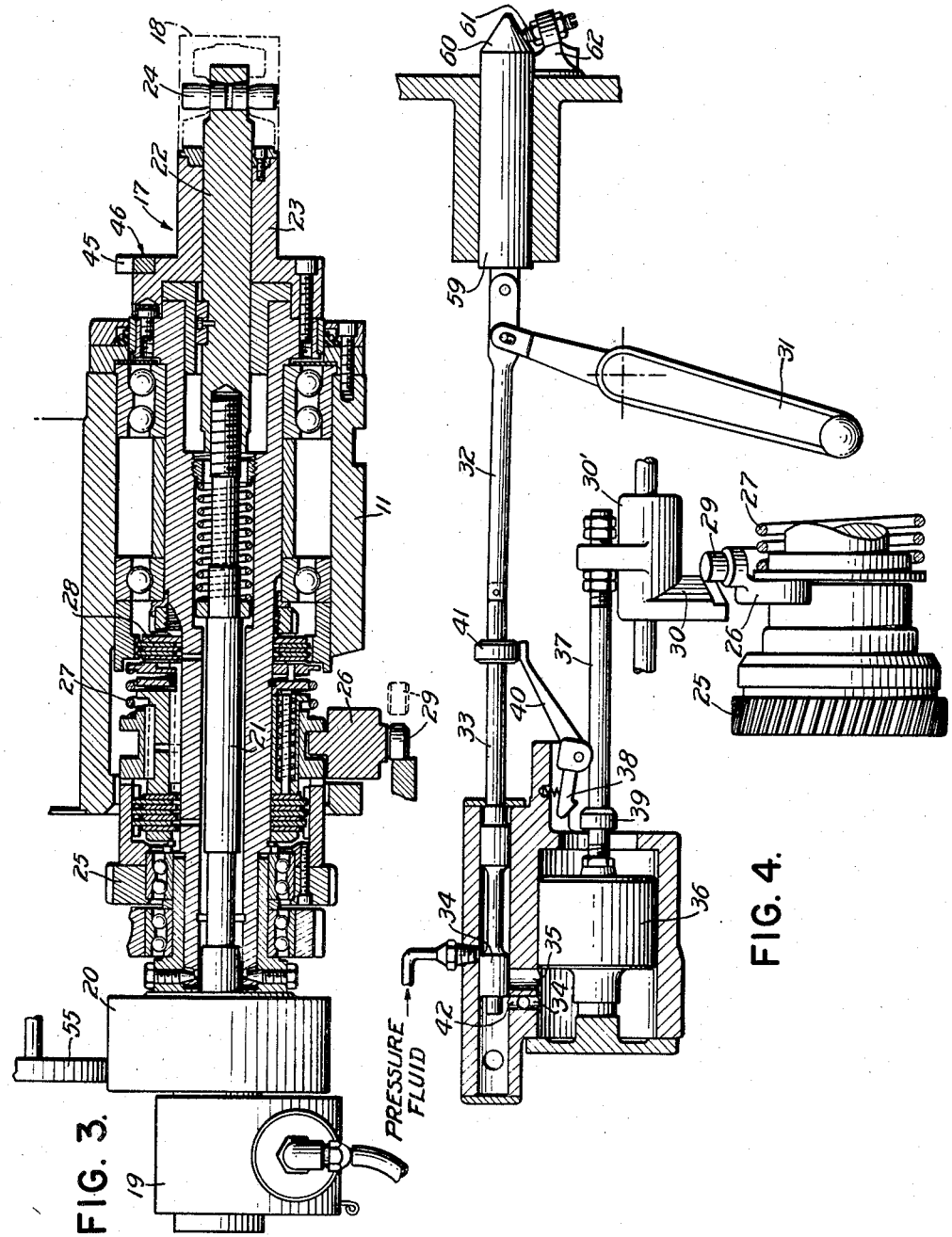
INVENTOR
WILLIAM B. RETZ
BY
ATTORNEYS Patented July 21, 1953

2,646,152

UNITED STATES PATENT OFFICE 2,646,152

STOP DEVICE FOR CHUCKING MEANS

William B. Retz, Plainville, Conn., assignor to The New Britain Machine Company, New Britain, Conn., a corporation of Connecticut Application July 29, 1948, Serial No. 41,298

7 Claims. (Cl. 192—149)

My invention relates to machine tools and in particular to a multiple-station indexing machine in which rotating spindles are periodically indexed into a succession of working stations.

In a chucking machine in which new pieces of work are loaded into chucking means which has been brought to rest, it is often desirable to have the chuck stop in the same position or orientation, for each chucking operation. This is especially true if the work to be loaded is of irregular shape or if an auxiliary means (such as a pin) must be inserted in a hole in the work in order to hold the work in the chuck. In the past, a partial rotation of the chuck has been necessary to obtain the desired orientation, and this has been accomplished by stopping the spindle and by then gently clutching the drive, before finally bringing the spindle to rest at the desired or predetermined orientation. In these days of high production and fast work cycles it is no longer satisfactory to rely upon such a cumbersome manually controlled operation.

It is, accordingly, an object of the invention to provide an improved device of the character indicated.

It is another object to provide in a machine of the character indicated an automatically operated mechanism that may assure that a spindle will be stopped in a given angular orientation each time the spindle is brought to rest.

It is a general object to provide an improved spindle stopping mechanism that may reduce the work cycle to a minimum and that may eliminate much of the time involved in loading and unloading.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 3 is a sectional view of a spindle that may be employed in the mechanism of Fig. 1; and Fig. 4 is a schematic diagram of certain elements associated with clutching operations of the spindle of Fig. 3.

Figure 1:
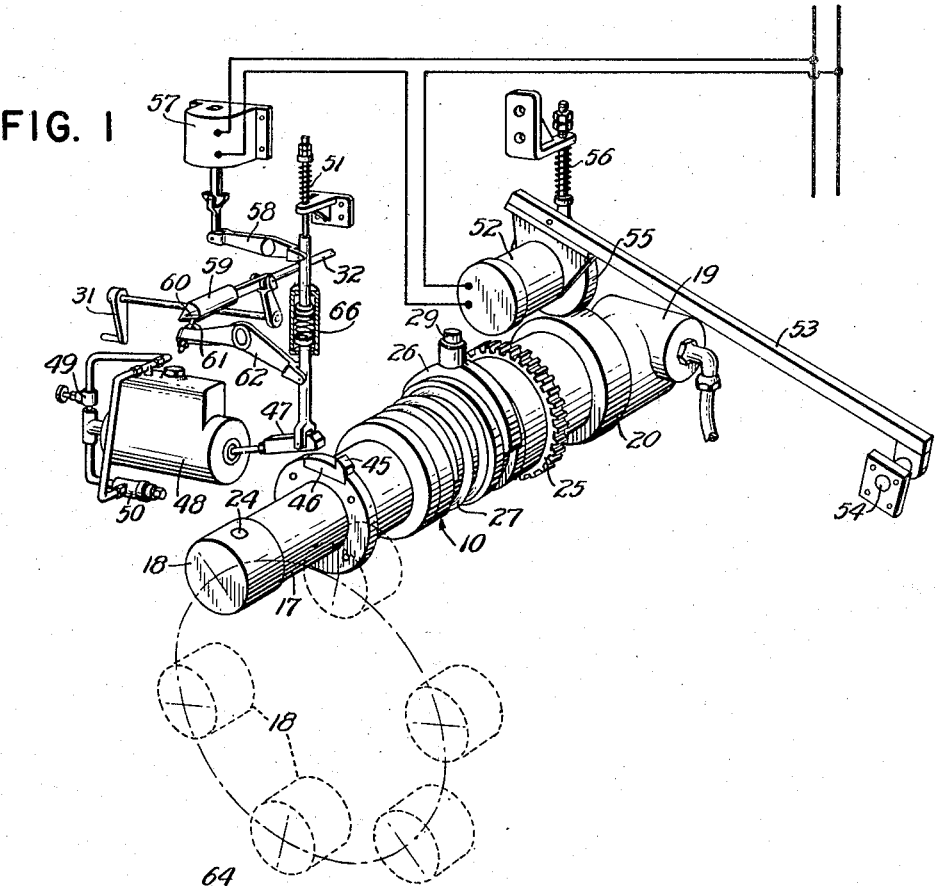
Fig. 1 is a simplified schematic perspective view of parts of a multiple-spindle chucking machine to which a mechanism according to the invention has been applied.

Briefly stated, my invention contemplates means serving always to bring a spindle to rest at the same desired angular orientation relative to the frame of the machine. In application to a multiple-spindle chucking machine such means is of course applicable to spindles at the unloading and chucking station. Such means may employ a locating element in the form of a radially offset abutment or discontinuity carried at a characteristic location on the spindle, the offset portion serving positively to identify a given angular position or orientation. Various means may be devised for assuring that this locating portion be always stopped in the same position relatively to a fixed part of the machine, and in the form to be described I provide abutment means including a displaceable member fixedly related to the frame of the machine; at the appropriate moment this displaceable member is placed in a position to intercept the locating portion and thus immediately to arrest rotary movement of the spindle.

Referring to the drawings, my invention is shown in application to an indexing type of multiple-spindle chucking machine in which there may be six spindles, such as the spindle 10, rotatably carried in a single spindle carrier 11. For the sake of simplicity the drawings have been limited to a detailed showing only of the spindle 10, and it will be understood that the other five spindles 12—13—14—15—16 may be of similar construction and located as indicated by the phantom outlines of Fig. 2. Each spindle may include suitable chucking means 17 for supporting a work piece 18, and in Fig. 1 the spindle positions are schematically represented by phantom outlines of the work pieces 18' in the other working stations. At the rear of the spindle carrier, all spindles may be journalled in a gear 25' forming part of the indexing means for the carrier.

The spindles may each include hydraulic actuating means of conventional construction, as shown for example in greater detail in Patent No. 2,102,412 to George O. Gridley et al., issued December 14, 1937. In such a chucking system, actuating pressures are delivered to a non-rotating fluid distributing head 19, which may be at the rear or tail end of the spindle. These actuating pressures may then appropriately be applied within a cylinder 20 to control the axial positioning of a chucking rod 21. In the form shown, the rod 21 is screwed to a longitudinally displaceable member 22 which is slidable within a chuck housing or base 23 carried at the forward end of the spindle. The particular work sample 18 happens to be an automotive-type piston, and it may suitably be supported in the chucking means 17 by first inserting a transverse pin 24 in the wrist-pin openings and through a hole at the end of member 22. Upon subsequent application of retracting hydraulic pressure, the rod 21 (and hence the pin 24) will be drawn back positively to seat the skirt of the piston blank 18 on a suitable shoulder carried by the chuck body 17. It will be appreciated that, in order to facilitate loading and unloading a work piece such as the piston blank 18 at the chucking station, it may be desirable that the pin 24 always come to rest at the same given angular orientation with respect to the frame of the machine.

The remainder of the spindle 10 may be more or less conventional and is shown to be of a form more completely described in my copending patent application Serial No. 752,358, filed June 4, 1947. Drive of the spindle 10 may be received through a gear 25 which may be in constant mesh with a central drive gear on the axis of the spindle carrier 11, and a clutch-actuating member 26 may be normally urged by a compression spring 27 to clutch the drive gear 25 directly to the spindle. Upon actuation of the clutch-actuating member 26 in a direction further to compress the spring 27, the connection between drive gear 25 and the spindle may be effectively released and a brake applied, as through friction plates 28, in order to bring the spindle to a quick stop.

The clutch-actuating member 26 may carry a roll 29 for actuating engagement with cam means 30. The cam means 30 is preferably forward, that is, in a position to apply the brake 28 when the spindle to be loaded is in the loading station; in order that this particular spindle may be started in its rotation before indexing to the next station, suitable means may be provided for displacing the cam means 30 out of actuating relation with the roll 29, as in response to manual actuation of a crank 31. The crank 31 may be connected by a link 32 and a rod 33 to pilot-valve means 34 for controlling the admission through a port 35 of pressure fluid to the tail end of an actuating piston 36. Upon such actuation a piston rod 37 will be understood to be forcibly displaced to carry the cam means 30 into its most forward or actuating position, for application of the brake means 28. If desired, the brake may be retained mechanically in its applied position by means of a latch finger 38 engaging a suitable abutment carrier by the rod 37, the latch finger being lowered only when its actuating arm 40 rides off a ferrule 41 on the pilot-valve rod 33. Thus, in the form shown the mechanical latching means 38—39 may only become effective when the hand crank 31 is shifted counterclockwise so as to admit a brake-actuating pressure through the port 35. When it is desired to restart the spindle an actuation of crank 31 into the position shown will be understood to relieve the mechanical latch finger 38 while closing off the supply of pressure fluid through the port 35 and opening a port 42 for an exhaust of the actuating fluid. The spring 27 may then be sufficiently strong to drive the clutch-actuating member 26 in the direction of clutching the gear 25 to the spindle and at the same time to force longitudinal withdrawal of the cam means 30 and of the guided member 30' which supports it.

In accordance with the invention, I provide means operative upon the spindle at the loading station to assure that such spindle will be brought to rest at a given angular orientation; let it be assumed, for example, that it is desirable that the axis of the chucking pin 24 be vertical when the spindle stops. In order to effect this result each of the spindles may carry locating means in the form of a radially offset portion or member, which can be used for identification purposes in establishing the desired reference with respect to the frame. Such radially offset means may include a radial projection or abutment 45 in a block 46 inserted in a suitable recess in the chucking means 17. The mechanism which positively locates the stopping position of the abutment 45 (that is, of the spindle 10) may establish its reference engagement with the abutment 45 and with some fixed part of the machine before the spindle would otherwise have come to rest.

In the form shown, the stopping mechanism includes a member 47 which is displaceable into or out of engaging relation with the abutment 45, and in order to save wear and tear of the parts the displaceable member 47 may be linked to shock-absorbing means in the form of a dash pot 48. No details of the dash pot 48 are shown, but it will be understood that such means may be conventional and include an adjustable needle valve 49 to adjust the stiffness of shock-absorbing action and a suitable overload-relief valve 50 to bypass the needle valve when necessary.

The displaceable member or latch 47 may be normally held out of possible engagement with abutment 45, as in a raised position under the urging of a spring 51, and speed-responsive means operative upon a given reduction of spindle speed (preferably to some speed that is not quite a standstill but which will permit at least one further full revolution of the spindle before the spindle would otherwise have come to rest) may be operative to drop the latching member 47 into a position for dogging the abutment 45. Upon establishing the latching or dogging engagement the dash pot 48 may cushion the shock and quickly bring the spindle to rest. If desired, the dash-pot means 48 may include a compression spring (not shown) normally to return the latch member 47 to a given position forward of the dash pot 48 and hence to return the spindle 10 to exactly the desired angular orientation for loading or for other operations.

The speed-responsive means that determines the speed at which the latching operation takes place may be an electrically operated switch 52 supported on a swivel arm 53, pivoted as at 54 to the frame of the machine. The switch means 52 (which may be functionally analogous to one of the mechanisms shown in Patents 1,014,707, 1,607,836, and 1,604,497) may be driven by a friction wheel 55, spring-urged downward (as by a compression spring 56) into sufficiently good frictional engagement with a cylindrical part of the spindle, which part may be the outside of the hydraulic chucking cylinder 20. The switch 52 may be of the type that keeps an open circuit as long as the friction wheel 55 rotates greater than a given preferably relatively slow speed. As soon as the speed of rotation drops to this slow speed, the circuit is closed so as to energize a solenoid 57 which may be linked to a rocker arm 58 in order forcibly to drive the latching member 47 down into a position for dogging engagement with the abutment 45. In order that the dogging engagement may be relieved when the spindle is started again, a suitable cam member 59 having a conical camming face 60 and linked for operation by the hand crank 31 may be shifted forward, and it will be understood that upon such displacement of the member 59 a conical surface 60 may cam an adjustable abutment 61 on a rocker arm 62 that is also linked to the latch member 47, thus forcibly raising the same. During this cam operation of positively withdrawing the latch member 47, a resiliently opposed lost-motion connection (not shown) in the enlarged part 66 of the latch-lifting rod may permit latch withdrawal without disturbing solenoid 57; at the same time, however, the drive to the spindle is being engaged, and there may thus be only a relatively short instant of time before the spindle is again rotating sufficiently to cause a deenergization of the solenoid 57.

Thus far, the cam means 30 which has been described for applying and holding the brake of the spindle in the loading position has been described as having effectiveness only at the loading station. In order to speed up operations it may be desirable that the braking means for the spindle be applied as soon as possible following the last working operation upon the piece of work 18, thus making available for braking an additional time interval, i. e., the interval during which indexing takes place. In the form shown, this early application of the brake 28 may be effected by provision of additional cam means 63, which may be adjustably yet fixedly held with respect to the frame 64 of the machine and which may provide a declutching and brake-actuating surface that is effectively continuous with that of the cam means 30. The forward sloping edge 65 of the cam means 63 may extend virtually as far as the finishing spindle station (that is, the station in which the spindle 12 is shown) so that this camming edge 65 may intercept the clutch-actuating roll 29' of spindle 12 just as soon as indexing commences to bring spindle 12 into the loading position.

Figure 2:
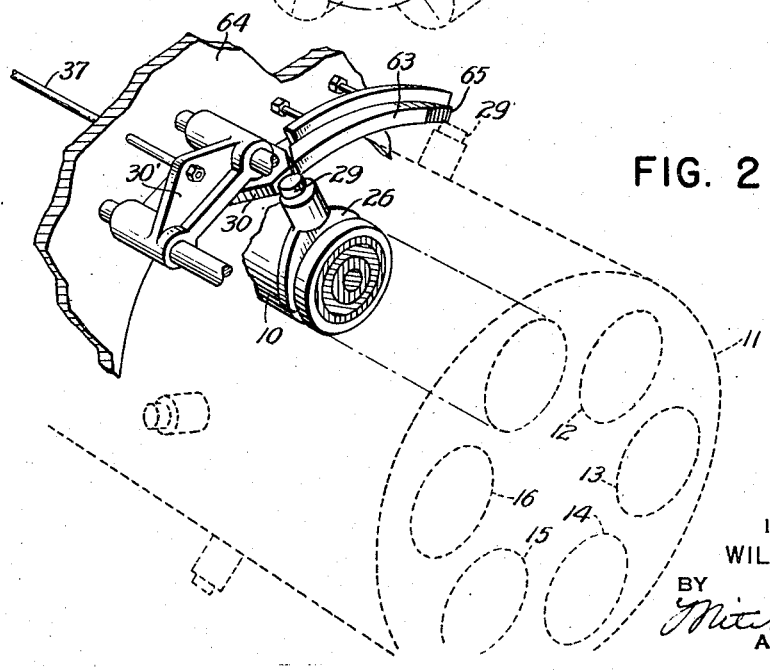
Fig. 2 is another simplified perspective view of further parts of the mechanism of Fig. 1.

I will briefly describe a cycle of operation of my stopping and locating mechanism, commencing with the relation of parts depicted in Figs. 1 and 2, wherein the spindle 10 is at rest and the pin 24 has just been inserted in a new work blank 18. The handle 31 may then be actuated clockwise (in the sense of Fig. 4) into the position shown in Fig. 4. This manual actuation will be understood to have forcibly removed the dogged or latching engagement of the spindle at 45—47, to have reengaged the drive to spindle 10, and to have clutched-in the main indexing mechanism (by means not shown). An indexing movement may commence immediately, thus passing the clutch-actuator roll 29 of spindle 10 beyond the influence of cam means 30. Concurrently, the clutch-actuator roll 29' of spindle 12 will have been intercepted by cam 63, and the spindle 12 will be declutched and decelerated by its brake 28. In its newly indexed position, the rotation of spindle 12 will be followed by the friction wheel 55 of switch 52; and, when the spindle speed is sufficiently reduced, switch 52 will energize solenoid 57 to dog the spindle to a shock-absorbed stop. The finished piece in spindle 12 may then be in the correct orientation for speedy removal upon an opening of the chucking means 17.

It will be appreciated that I have described an ingenious and relatively simple means for assuring that a work piece may always be stopped in a given desired orientation at a loading station. The automatic spindle-stopping mechanism may be brought into play substantially immediately upon completion of all work operations, so that no time need be wasted in unloading and rechucking. For the particular form which has been described, it will be appreciated that the simplicity and conventionality of parts may make possible ready adaptation of my invention to machines now in service.

While I have described my invention in detail for the preferred form shown, it will be understood that modifications may be made within the scope of the invention as defined in the appended claims.

I claim:

1. In a machine of the character indicated, a spindle carrier including a plurality of spindles, drive means including a clutch for each of said spindles, indexing means for said carrier, locating means on each of said spindles for identifying a particular angular orientation of each of said spindles, clutch-actuating means including a relatively fixedly based part and oriented to actuate one spindle clutch to the exclusion of another spindle clutch during an indexing movement of said spindle carrier, whereby the drive to one of said spindles may be disengaged during an indexing of said spindle carrier, and means operatively associated with said locating means on the spindle at said indexed position, said last-defined means including braking means relatively fixedly associated with the frame of said machine, whereby when a spindle is indexed into said position it may always be brought to a stop at a given orientation relative to said machine, upon a minimum lapse of time after the disengaged spindle reaches said indexed position.

2. A machine according to claim 1, in which there is manually actuated means for reengaging the drive to an arrested spindle at said indexed position, and wherein said manually actuated means is connected to disable said braking means upon such drive-reengaging operation, whereby the disabled spindle may be brought up to speed before and during the next indexing of said spindle carrier.

3. In a machine of the character indicated, a spindle carrier with a plurality of spindles, indexing means for said carrier, clutching means including a drive connection and a brake connection for each of said spindles, actuating means for said clutching means, cam means for one indexed position of said carrier and including a member effectively engaging said clutch-actuating means during indexing movement, additional braking and locating means engageable with a decelerating spindle, and speed-responsive means following rotation of the decelerating spindle and responsive to a substantially reduced speed of the decelerating spindle to apply said braking and locating means at said substantially reduced speed; whereby said locating means may engage and arrest said spindle at a prescribed angular orientation of said spindle, upon a minimum lapse of time after the braked spindle reaches the indexed position.

4. A machine according to claim 3, in which said cam means includes a displaceable element operatively engaging said clutch-actuating means at the arrested-spindle location of said spindle carrier, and in which manually operated means is associated with said displaceable element, whereby said arrested spindle may be manually restarted prior to the next indexing operation of said spindle carrier.

5. In a machine of the character indicated, a spindle carrier including a plurality of spindles, drive means including clutch means for said spindles, indexing means for said carrier, locating means on each of said spindles for identifying a particular angular orientation of each of said spindles, clutch-actuating means responsive to an indexing movement of said spindle carrier and including an element engaging one of said clutch means to the exclusion of another, whereby the drive to one of said spindles may be disengaged during an indexing of said spindle carrier, speed-responsive means also engageable with said one spindle during indexing of said spindle carrier and responsive to a spindle speed substantially less than the normal speed of spindle rotation, and means associated with said locating means on the spindle at said indexed position and including braking means relatively fixedly associated with the frame of said machine, said last-defined means being operated in response to an operation of said speed responsive means, whereby when a spindle is indexed into said position it may always be brought to a stop at a given orientation relative to said machine upon a minimum lapse of time after the disengaged spindle reaches said indexed position.

6. In a machine of the character indicated, a spindle carrier including a plurality of spindles, drive means including clutch means for said spindles, indexing means for said carrier, locating means on each of said spindles for identifying a particular angular orientation of each of said spindles, declutching means responsive upon commencement of an indexing operation for disengaging the drive to one of said spindles, whereby substantial deceleration of said one spindle may take place during said indexing operation, speed-responsive means also engageable with said one spindle during said indexing of said spindle carrier and responsive to a spindle speed substantially less than the normal speed of spindle rotation, and means associated with said locating means on the spindle at said indexed position and including braking means relatively fixedly associated with the frame of said machine, said last-defined means being operated in response to an operation of said speed-responsive means, whereby when a spindle is indexed into said position it may always be brought to a stop at a given orientation relative to said machine upon a minimum lapse of time after the disengaged spindle reaches said indexed position.

7. In a machine of the character indicated, a spindle carrier with a plurality of spindles carried thereby and having a particular indexed station at which a spindle is to be brought to rest, drive means for said spindles and including a separate clutch for a spindle moving to said particular indexed station from the station immediately preceding, disengaging means for said clutch and responsive to indexing movement of said spindle from said preceding station to said particular station, whereby the drive to said spindle may be disengaged during indexing movement, speed-responsive means engaging said spindle during said indexing operation and responsive to attainment of a speed of rotation substantially less than the normal rotational speed of said spindles for determining a reduced spindle speed at which the spindle may be safely abruptly stopped, locating means on each of said spindles and identifying a given angular orientation of each of said spindles, and means relatively fixedly related to the frame of said machine and including a member to be positioned for engagement with said locating means, said speed-responsive means being operatively associated with said member, for the purpose described.

WILLIAM B. RETZ.

References Cited in the file of this patent

UNITED STATES PATENTS

| Number | Name | Date |
| --- | --- | --- |
| 1,874,804 | Reese | Aug. 30, 1932 |
| 2,079,637 | Simpson | May 11, 1937 |
| 2,085,442 | Newell | June 29, 1937 |
| 2,191,137 | Trible | Feb. 20, 1940 |
| 2,192,437 | Groene | Mar. 6, 1940 |
| 2,288,135 | Hoza | June 30, 1942 |
| 2,338,975 | Schumacker | Jan. 11, 1944 |
| 2,350,975 | Rodder et al. | June 6, 1944 |

FOREIGN PATENTS

| Number | Country | Date |
| --- | --- | --- |
| 304,588 | Germany | Mar. 25, 1918 |